United States Patent [19]

Chen

[11] Patent Number: 5,040,388
[45] Date of Patent: Aug. 20, 1991

[54] AUTOMOBILE STEERING LOCK

[75] Inventor: Shih-Yu Chen, Tainan, Taiwan

[73] Assignee: All Ship Enterprise Co., Ltd., Tainan, Taiwan

[21] Appl. No.: 611,048

[22] Filed: Nov. 9, 1990

[51] Int. Cl.⁵ .............................................. B60R 25/02
[52] U.S. Cl. ......................................... 70/209; 70/226
[58] Field of Search ................. 70/209, 225, 226, 211, 70/212, 237, 238

[56] References Cited

U.S. PATENT DOCUMENTS

| 4,738,127 | 4/1988 | Johnson | 70/209 |
| 4,887,443 | 12/1989 | Wang | 70/209 |
| 4,935,047 | 6/1990 | Wu | 70/209 |

FOREIGN PATENT DOCUMENTS 1127524  9/1968  United Kingdom ................. 70/226

Primary Examiner—Lloyd A. Gall
Attorney, Agent, or Firm—Morton J. Rosenberg; David I. Klein

[57] ABSTRACT

An antitheft device for attachment to a steering wheel of an automobile comprising an elongated body member having a passageway extending axially therein. A first hook is secured to the body member for engagement with a portion of the steering wheel. The first hook engages the wheel from the inside of the rim, with the body member extending outward beyond the periphery of the steering wheel. An elongated tubular member adapted to move in telescopic fashion within the passageway of the body member, along it axis, includes a second hook, secured thereto, for engaging the inside portion of the steering wheel at a point diametrically opposed to the first hook. A rod membr, adapted to move in telescopic fashion within the tubular member, is provided for preventing the steering wheel from complete rotation. A locking assembly, associated with the body member, is provided for engaging the tubular member and rod member within the passageway formed in the body member, whereby the tubular member and the rod member can be extended with respect to the body member and locked at any one of a plurality of positions.

1 Claim, 3 Drawing Sheets 5,040,388

AUTOMOBILE STEERING LOCK

BACKGROUND OF THE INVENTION

1. FIELD OF THE INVENTION

The present invention relates to an automobile antitheft device. More particularly the present invention is directed to a device for attachment to an automobile steering wheel to prevent complete rotation thereof, and thereby securing the automobile against unauthorized use.

2. PRIOR ART

Antitheft devices which attach to an automobile steering wheel are known, such as that shown in U.S. Pat. No. 4,738,127 to Johnson. Such antitheft devices for attachment to a steering wheel of an automobile include an elongated body member having a passage extending therethrough. An elongated rod member is adapted to move in telescopic fashion within the passageway of the body member and opposed hooks are provided for engaging the inside portion of the steering wheel. A lock assembly is associated with the body member, engaging the elongated rod within the passage for locking the rod member in a stationary position with respect to the body member, at any of a plurality of positions.

U.S. Pat. No. 4,887,443 to Wang, and U.S. Pat. No. 4,935,047 to Wu, disclose other antitheft devices which are similar in construction. These devices include a rod-like member slidably mounted in a transverse passageway of the housing assembly, and includes a locking member attached to an end of the rod-like member. The locking member is arranged to be actuated between a locked position, with the locking member extending into an annular groove formed in the circumference of a rod member, which permits the rod member to telescope freely within a body member, and an unlocked position with the locking member withdrawn from annular groove.

While the antitheft devices described above are functional, they include several defects. For example, in order to block comlete rotation of the steering wheel of a motor vehicle, each device includes an extended portion. The inclusion of this extended portion results in the device being too long in length to be carried in the glove box of the motor vehicle.

SUMMARY OF THE INVENTION

It is accordingly a primary object of the present invention to provide an automobile steering wheel lock that overcomes the foregoing defects associated with prior art systems.

Another object of the present invention is to provide an automobile steering wheel lock which can extend in two stages, so as to reduce its length when in a collapsed state.

A further object of the present invention is to provide a locking device wherein the locking mechanism is totally enclosed, and provides no area susceptible to prying by a crowbar, rigid pin or the like.

DETAILED DESCRIPTION OF A PREFERRED EMBODIMENT

Figure 1:
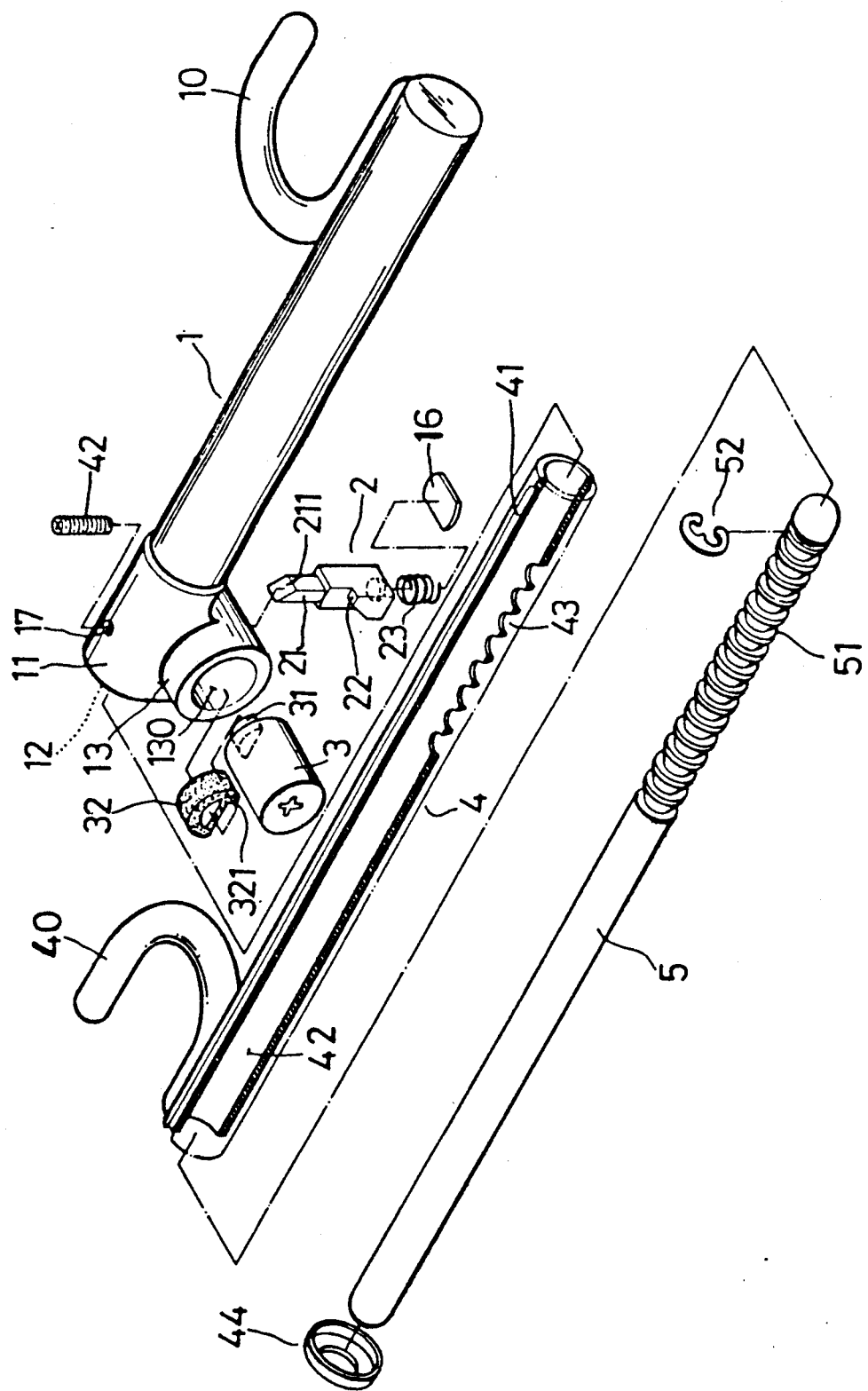
FIG. 1 is an exploded perspective view in partial section illustrating a preferred embodiment of the present invention.

Referring to FIG. 1, there is shown, an automobile steering wheel lock according to the invention which comprises an elongated body member 1, an elongated tubular member 4 which is dimensioned to move in telescopic fashion within body member 1, and an elongated rod member 5 which is dimensioned to move in telescopic fashion within the tubular member 4. A pair of hooks 10 and 40 are provided for engaging opposing portions of a steering wheel from inside the open portions thereof. Hooks 10 and 40 are respectively provided on the body member 1 and the tubular member 4. A locking mechanism including a lock 3, an actuator 32 and a bearing member 2, being provided within the housing 11 to position and lock the tubular member 4 and the rod member 5 in a stationary position with respect to the body member 1 at any one of a plurality of positions.

The body member 1 includes an elongated tube 1 defining a central passage 12 extending longitudinally from an open front end to a closed rear end. The first generally L-shaped member 10 is fixedly secured to one side of a rear portion of the tube 1, by means of welding, to form a hook 10 which opens rearwardly along the body member 1. The tubular member 4 includes an elongated tube 4 of circular cross-sectional contour having an outer diameter which is dimensioned to be slightly less than the diameter of the central passage 12 formed in the body member 1 to enable tubular member 4 to telescope freely therein. Elongated tube 4 includes a cylindrical central passage 42 which extends axially therethrough.

Second generally L-shaped member 40 is fixedly secured to the front end portion of the tubular member 4, to form a hook 40. Hook 40 opens opposite in direction to that of hook 10, for engagement with a diametrically opposed portion of a steering wheel. A longitudinally extended groove 41 is formed in an upper surface of rear half portion of the tubular member 4. A plurality of openings 43 are formed in a lower surface of a rear half portion of tubular member 4 in longitudinally spaced relation, and in diametrically opposed relation to the groove 41. A cap member 44 is provided for covering the front open end of the tubular member 4, and is provided with a central opening formed therethrough.

The rod member 5 includes an elongated rod 5 of circular cross-sectional contour, having a diameter which is dimensioned to be slightly less than the respective diameters of the second passage 42 formed in the tube 4, and the central opening of the cap member 44. Thus, the rod member 5 is able to telescope freely within the tube 4 through the central opening of the cap member 44. A plurality of annular grooves 51 are formed in a rear portion of the rod member 5, the annular grooves being disposed in parallel spaced relation along the longitudinal axis of rod member 5. A substantially C-shaped clip 52 is provided for engaging an endmost annular groove, disposed close to the rear end of the rod member 5. The engaged clip 52 is able to slide within the second passage 42 of the tubular member 4, but is dimensioned to prevent the clip 52 from passing through the central opening of the cap member 44 and the rod member 5 therewith.

The housing 11 is coupled to the front end of the body member 1, and includes a central passage extending therethrough, and in open communication with the central passage 12 of the body member 1. The locking mechanism includes the lock 3, the actuator 32 and the bearing member 2.

The housing 11 includes an integrally formed boss 13, offset with respect to the axis of the body member 1 and having a bore 130 extending transversely therein for firmly receiving the lock 3 which is a conventional key lock 3 and includes a projection 31 formed on the inner end thereof. A screw hole 17 is formed in upper portion of the housing 11. The screw hole 17 communicates with the central passage of housing 11. Screw hole 17 receives a screw 42 which is threaded therein. Screw 42 protrudes into the longitudinal groove 41 of tubular member 4 to act as a guide, allowing tubular member 4 to move axially, yet prevent rotation of tubular member 4 with respect to the body member 1, as best shown in FIGS. 2 and 4.

Figures 2, 3:
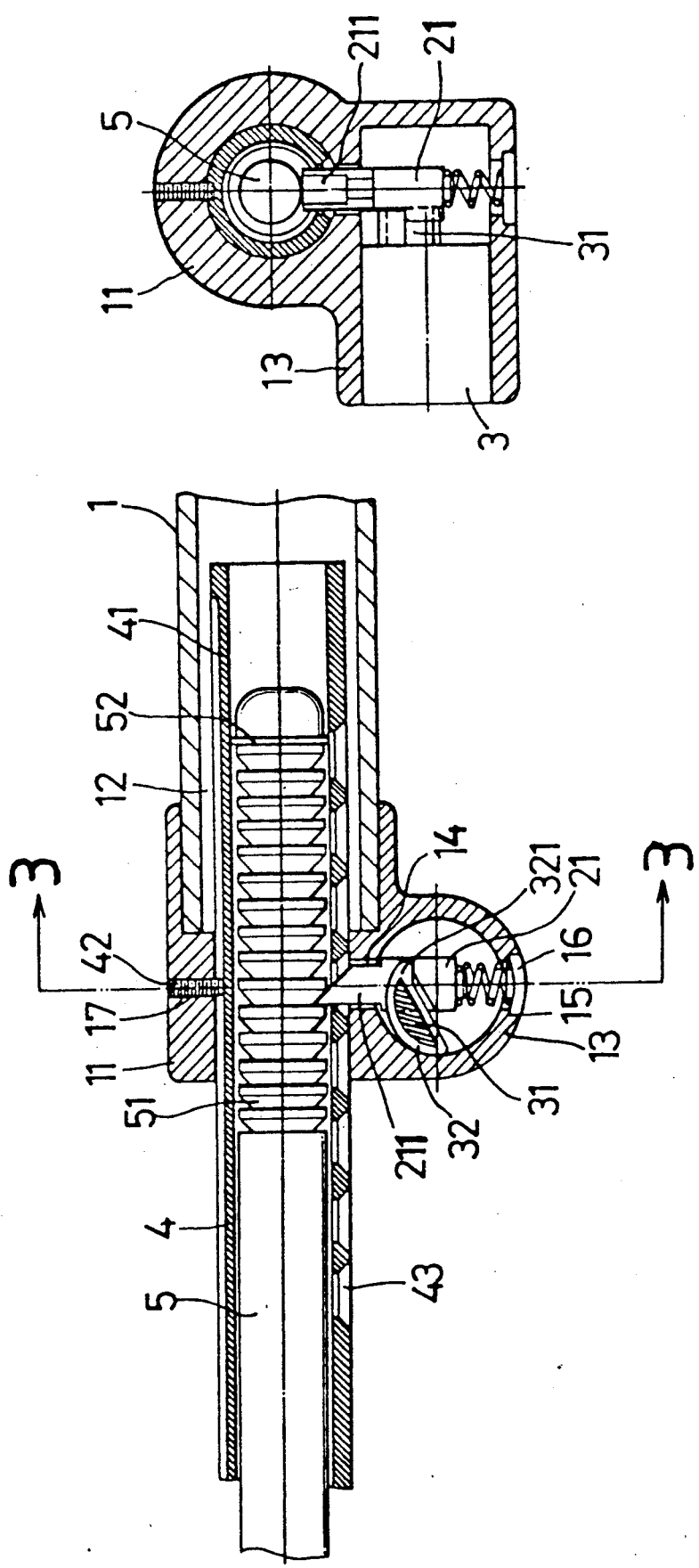
FIG. 2 is a partially cross-sectional view of the preferred embodiment shown in locked condition.
FIG. 3 is a sectional view taken along the section line 3—3 of FIG. 2.
Figures 4, 5:
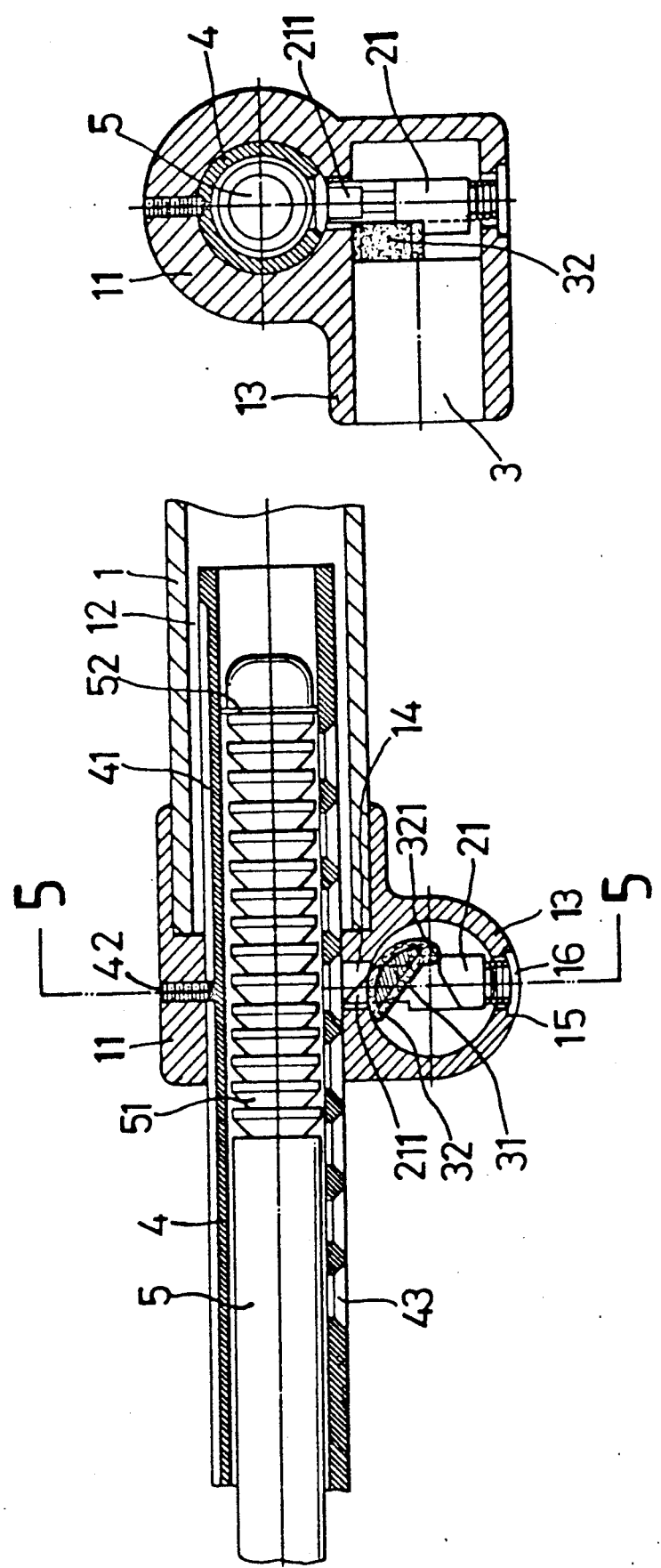
FIG. 4 is a partially cross-sectional view of the preferred embodiment shown in an unlocked condition; and, FIG. 5 is a sectional view taken along the section line 5—5 of FIG. 4.

To accommodate the bearing member 2, a second passage 14, as shown in FIGS. 2 and 4, is vertically formed in the housing 11. The passage 14 interconnects with the bore 130 and the central passage of housing 11. A hole 15, formed in vertical alignment with the second passage 14, is formed in a bottom wall of housing 11 for facilitating the insertion of the bearing member 2 into the housing 11. A metal plate 16 is provided as a closure for the hole 15, secured by a press fit.

The bearing member 2 includes a first rod-like member 21 having a cylindrically shaped projection integrally formed on the bottom thereof, for retaining an end of a spring 23. The top of bearing member 2 is inclined to form an insert end 211, and one side is formed with a protuberance 22 extending therefrom.

The actuator includes an arcuate outer surface and a flat top defining a substantially semicircular cross-sectional contour. Actuator 32 further includes an inner wall having a recess for receiving projection 31 of the key lock 3, and an edge projection 321 disposed at one edge of the flat top portion thereof.

In assembly, as shown in FIGS. 2 and 3, the member 21 is inserted into the vertical passage 14 through the hole 15, and the cylindrical key lock 3 is firmly received in the bore 130, with the projection 31 disposed in the recess of the actuator 32. The edge projection 321 of the actuator 32 abuts against the protuberance 22 of member 21. The spring 23 is disposed between the bottom of member 21 and the metal plate 16 which is disposed in the hole 15.

In operation, the member 21 is biased by the spring 23, which is normally in a compressed condition, towards the tube 4 in which the rod member 5 is disposed. The insert end 211 of the member 21 passes through one of a plurality of openings 43 formed in tubular member 4 and protrudes into an annular groove 51 of the rod member 5 to lock the tube 4 and the rod 5 with respect to the body member 1, at one of a plurality of possible positions.

As shown in FIGS. 4 and 5, when the actuator 32 is rotated clockwise by the key lock 3, the biasing force of spring 23 is overcome and the member 21 is pressed downwardly to withdraw the insert end 211 of member 21 from the opening 43 of tube 4 and annular groove 51 of the rod member 5, into the vertical passage 14. Thus, freeing rod member 5 and tube 4 to telescope in and out with respect to the body member 1, for extension or collapsing movement of the device. For extension in the unlocked condition, the tube 4 can first be extended for engagement with opposed portions of a steering wheel with the hooks 10 and 40. Subsequently, the rod member 5 can be extended by pulling the front protruding end from the cap 44 into corner portion of the vehicle interior, restricting the complete rotation of the steering wheel of the car.

While the invention has been described with respect to a preferred embodiment, it is obvious that various modifications can be made therein without departing from the spirit of present invention which should be limited only by the scope of the appended claim.

I claim:

1. An antitheft device for attachment to a steering wheel of an automobile, comprising:

a first longitudinally extended tubular member having a centrally disposed passageway extending longitudinally from an open first end to an opposing second end, said second end being closed and having a first hook member fixedly coupled to an external surface of said first tubular member adjacent said second end;

a second longitudinally extended tubular member being dimensioned for telescopic receipt within said passageway formed in said first tubular member and having a bore extending axially therethrough, said second tubular member having an axially extended groove formed in an external surface thereof, said second tubular member having a plurality of through openings formed in longitudinally spaced relation adjacent a first end thereof;

a second hook member fixedly coupled to said second tubular member adjacent a second end thereof;

a cap member coupled to said second end of said second tubular member, said cap member having a through opening formed therein, said through opening being in axial alignment with said bore of said second tubular member for open communication therethrough;

a rod member dimensioned for telescopic receipt within said bore formed in said second tubular member and for passage through said through opening formed in said cap member, said rod member having a plurality of annular grooves formed in axially spaced relation on one end thereof;

a clip member coupled to said rod member within an end-most one of said plurality of annular grooves, said clip member having an external diameter dimension being (1) greater than a diameter dimension of said cap through opening, and (2) less than a diameter dimension of said second tubular member bore;

a housing extending axially in said longitudinal direction and having one end coupled to said open end of said first tubular member, said housing having (1) a through passage formed therein, said through passage being in open communication with said first tubular member passageway and in axial alignment therewith, and (2) a through opening formed through a wall of said housing for receiving a screw therein, said screw extending through said housing wall for insertion into said groove formed in said second tubular member, said housing including a boss extending transverse to said longitudinal direction of said first tubular member, said boss having a transversely extending passageway formed therein, said boss further having a through opening extending between said transverse passageway and said passageway formed in said first tubular member; and, locking means disposed within said transverse passageway of said boss for releasably coupling said second tubular member and said rod member to said first tubular member, said locking means including:

a. a spring biased rod-like bearing member, said rod-like bearing member being disposed in said through opening formed in said boss, said rod-like bearing member having an insert end for engagement with one of said plurality of annular grooves of said rod member through a respective one of said through openings formed in said second tubular member;

b. an actuating member disposed within said transverse passageway of said boss for vertical displacement of said rod-like bearing member responsive to rotation of said actuating member; and, c. a lock rotatively coupled to said actuating member for rotatively displacing said actuating member responsive to an actuation of said lock.

* * * * *